July 15, 1952 W. F. WELLS 2,602,987
BAND SAW
Filed March 5, 1947 3 Sheets-Sheet 1

INVENTOR.
William F. Wells
BY
Otto A. Earl
ATTORNEY.

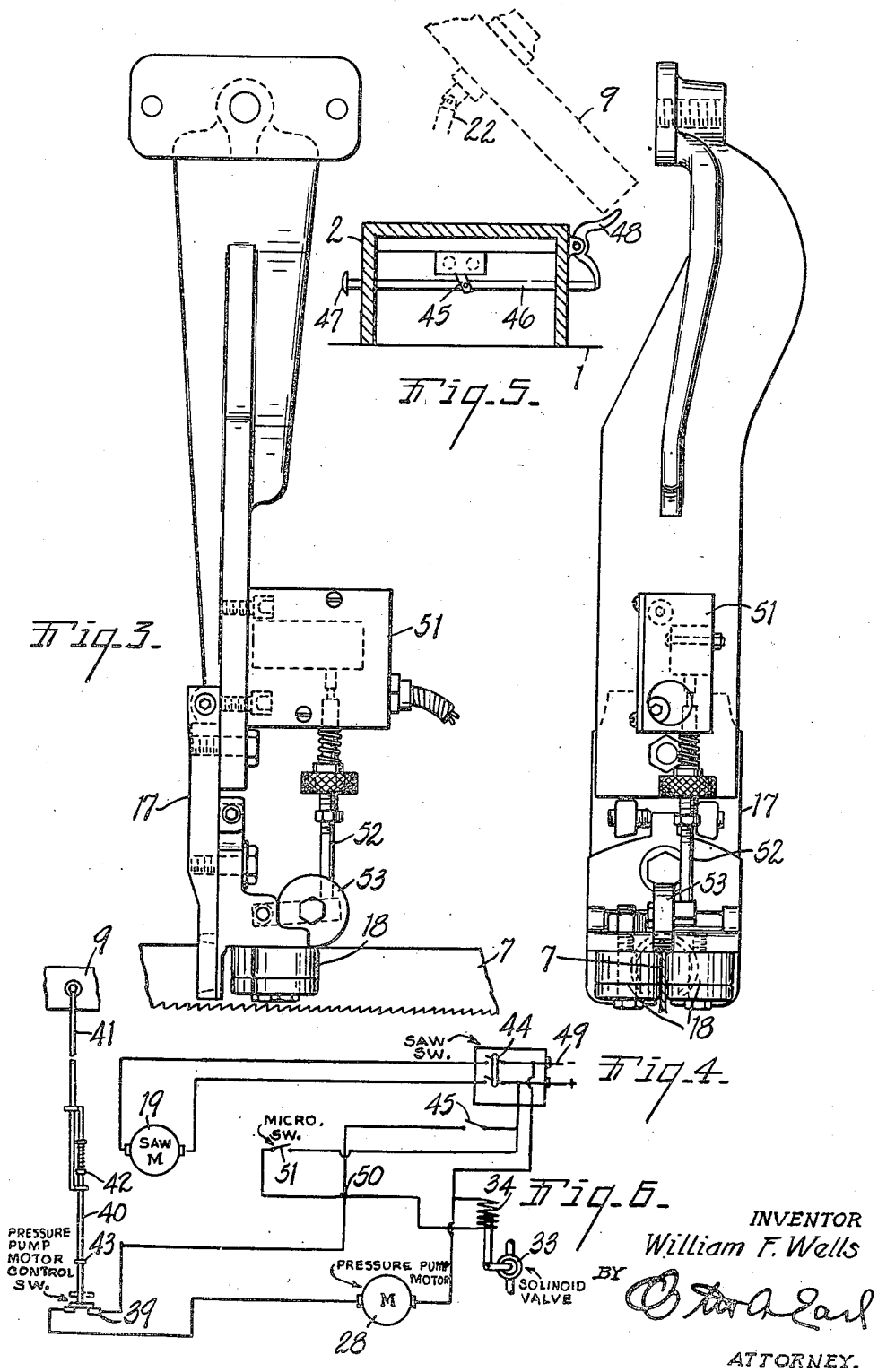

Patented July 15, 1952

2,602,987

UNITED STATES PATENT OFFICE 2,602,987

BAND SAW

William F. Wells, Three Rivers, Mich., assignor to Wells Manufacturing Company, Three Rivers, Mich.

Application March 5, 1947, Serial No. 732,619

7 Claims. (Cl. 29—68)

This invention relates to improvements in band saws.

The principal objects of this invention are:

First, to provide a band saw for cutting metal, which is hydraulically operated to provide a uniform cutting speed.

Second, to provide a band saw for cutting metal, with automatic controls which will operate the saw at a maximum cutting speed regardless of hard spots or variations in cross section of the stock being cut.

Third, to provide a band saw for cutting metal which need not to be supervised during the cutting operation.

Fourth, to provide a band saw for cutting metal with accurately controlled hydraulic means for raising and lowering the saw.

Fifth, to provide a hydraulic lift for a band saw or other tool which is especially sensitive to changes in the hydraulic pressure.

Other objects and advantages of the invention will appear from the following description. The invention is defined and pointed out in the claims.

The drawings, of which there are three sheets, illustrate a preferred form of my band saw.

Fig. 3 is a fragmentary elevational view of one of the saw guides with part of the saw regulating mechanism in place thereon.

Fig. 4 is a fragmentary end elevational view of the guide arm shown in Fig. 3.

Fig. 5 is a fragmentary cross-sectional view taken along the plane 5—5 in Fig. 1.

Fig. 6 is a schematic diagram showing the wiring connections of the saw.

Figure 1:
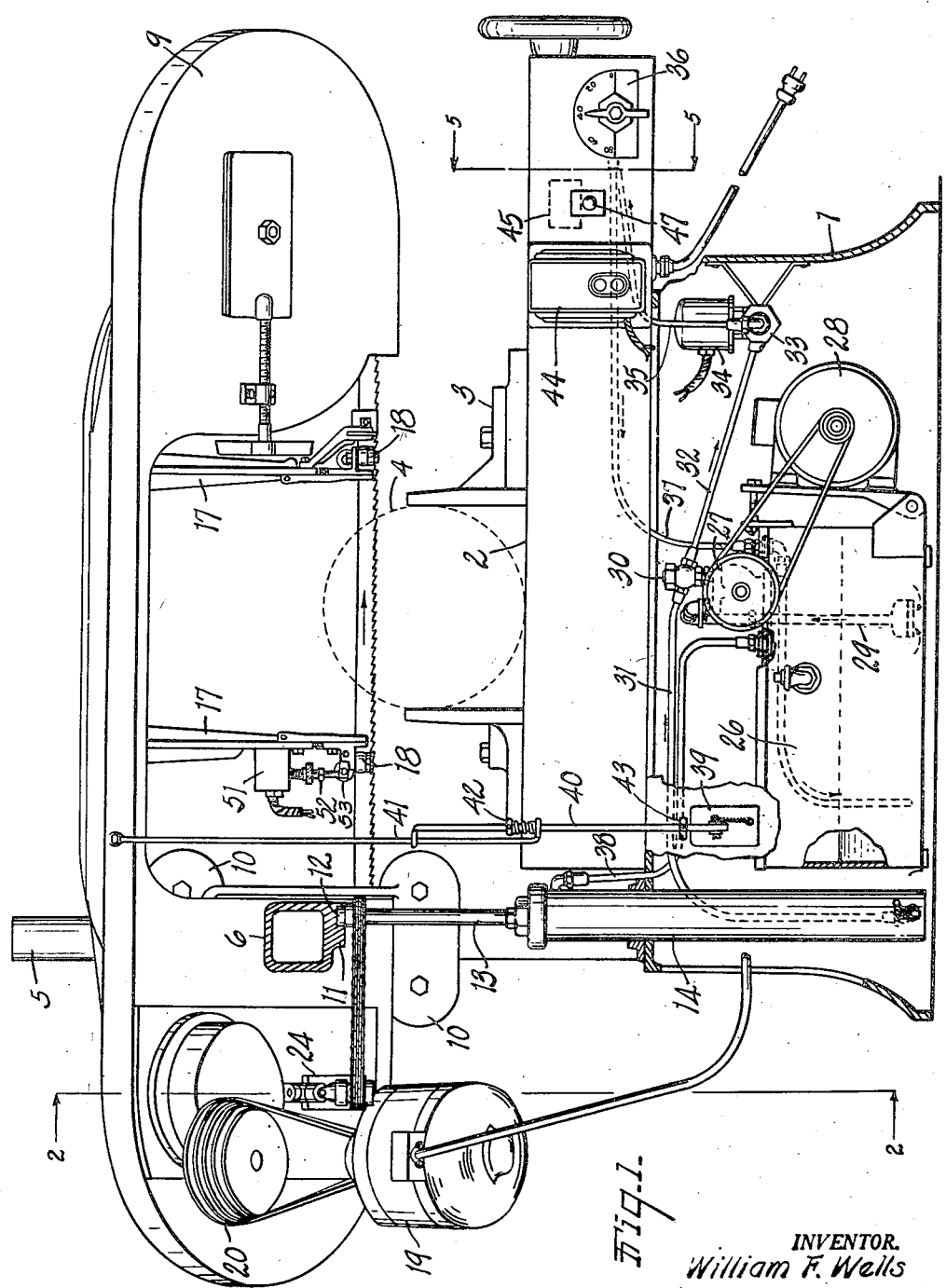
Fig. 1 is a front elevational view partially broken away in cross section showing the saw in operating position.
Figure 2:
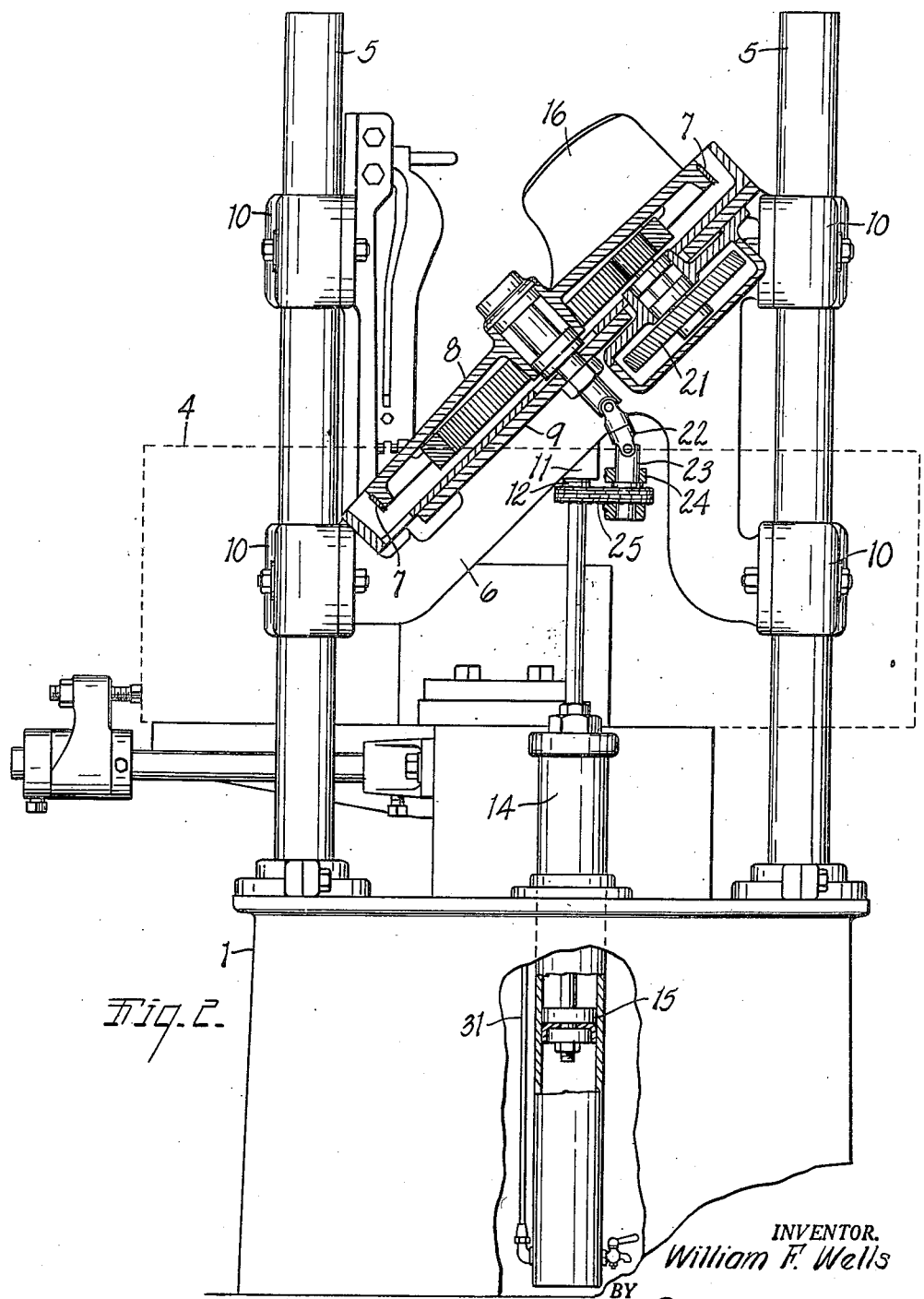
Fig. 2 is a transverse cross-sectional view taken on the plane 2—2 in Fig. 1.

In the drawings the reference character 1 indicates a base member for the saw on which is mounted a bed 2 provided with a vise 3 for holding the stock to be cut as indicated by the dotted lines at 4. Secured to one end of the base are a pair of vertical guide members 5 which support the frame 6 on which the saw 7 is mounted by means of suitable pulley wheels 8 enclosed in guards 9. The frame 6 is provided with sliding connections 10 by means of which it is slidable vertically on the guides 5.

A boss 11 formed on the under side of the frame is shaped to receive a bearing 12 which journals the upper end of a lift rod 13. The lift rod extends downwardly into the hydraulic cylinder 14 and is provided with a piston 15 positioned within the cylinder. The piston and lift rod are thus arranged to raise and lower the frame 6 and the saw 7 relative to the bed 2 under the influence of hydraulic pressure in the cylinder 14.

The frame 6 is provided with a longitudinally extending beam 16 which supports the outer pulley wheel on the frame and which also supports a pair of guide bars 17 over the working portion of the saw. The guide bars 17 are each provided with a pair of rotatable rollers 18 which are positioned on either side of the saw blade and locate the cutting portion of the saw relative to the stock being cut.

An electric motor 19 is secured to the underside of the frame 6 and is arranged to drive the saw through a belt and pulley arrangement 20 which is connected to suitable reduction gearing 21 mounted in the guard member 9. The shaft for the driving saw pulley 8 extends through the guard 9 and is connected by means of a universal joint 22 to the vertical gear shaft 23 mounted in a bracket 24 on the under side of the guard. The gear shaft 23 is connected by means of the driving chain 25 with the upper end of the lift rod 13. Thus when the saw motor 19 and saw are rotating, the lift rod 13 and piston 15 will be rotating within the cylinder 14. Rotation of the lift rod and its piston make the lift rod more sensitive to changes in pressure in the cylinder since the static friction between the walls of the cylinder and the piston is already broken or overcome by the rotation of the piston. Therefore, the piston and lift rod will react promptly to changes of pressure in the cylinder 14 to raise or lower the frame 6 and the saw carried thereon.

Positioned underneath the base 1 is a reservoir 26 which is arranged to hold a quantity of oil or other hydraulic fluid and which supports a hydraulic pump 27 arranged to be driven by a pump motor 28. The pump 27 is arranged to take in oil through the intake pipe 29 and deliver it under pressure to the T fitting 30, from where the oil may flow either through the conduit 31 to the bottom of the cylinder 14 or through the conduit 32 to a valve 33 controlled by the electric solenoid 34. The valve 33 is connected by means of the conduit 35 to a pressure regulating valve indicated at 36. From the regulating valve 36 the hydraulic system of the saw is re-connected to the reservoir 26 by the conduit 37. A return oil line 38 extends from the top of the cylinder 14 to the reservoir 26 to relieve the pressure behind the piston 15 and return any oil which may leak behind the piston to the reservoir.

Mounted on the side of the base 1 is an electrical toggle switch 39 arranged to be turned on and off by vertical movement of the control rod 40. The control rod 40 is slidably connected with a rod 41 secured to the frame of the saw and movable vertically therewith. The lower end of the rod 41 is looped around the control rod 40 and arranged to lift or depress the control rod by engagement with an upper stop 42 or the lower stop 43. The stops 42 and 43 are adjustable on the control rod 40 to adapt the saw to various sizes and shapes of stock to be cut.

Mounted on the side of the bed 2 is a motor control switch 44 arranged to control the operation of the saw motor 19 independently of the pump motor. A toggle switch 45 connected in series with the switch 39 is mechanically connected to the push rod 46 so that it may be closed either by pulling out on the control knob 47 or by the trip lever 48 on the back of the saw bed being engaged by the guard member 9 when the saw and frame 6 are at the bottom of their travel, see Fig. 5. The switch may, of course, be opened by pushing in the control knob 47.

The solenoid 34 which operates the valve 33 is arranged to close the valve when the winding of the solenoid is energized. As is indicated in the wiring diagram in Fig. 6, the solenoid 34 has one end constantly connected to the current supply line indicated at 49 while its other end is connected at 50 to the toggle switch 45 so that closing the switch 45 will energize the solenoid and close the valve. The solenoid is further connected to a microswitch 51 mounted on one of the saw guides 17. The microswitch 51 is provided with a spring pressed plunger 52 which carries a roller 53 arranged to ride along the upper edge of the saw 7. The roller 53 is pivotally supported on the saw guide 17 as is best indicated in Figs. 3 and 4, so that upward deflection of the saw such as will be caused by too great a pressure of the saw on the stock, will raise the roller and the plunger 52 to close the microswitch. Thus, the microswitch 51 is arranged to energize the solenoid 34 and close the valve 33 regardless of the position of the toggle switch 45.

The microswitch 51 is of the type arranged to be actuated by very small variations in pressure on its plunger and so is effective in quickly detecting variations in the cutting speed of the saw.

The operation of the saw from an at-rest position with the frame 6 and saw 7 in lowered position is as follows:

The toggle switch 45 will be in closed position, the push rod 46 having been thrown to the front of the machine by engagement of the saw guard with the trip lever 48. Therefore, the solenoid 34 will be energized and the valve 33 will be closed. The frame 6 being in lowered position, the rod 41 will have engaged the stop 43 and closed the toggle switch 39 so that an electrical circuit is completed through the two toggle switches and the pump motor 28 is energized to operate the pump. The conduit 32 being closed off by the valve 33 as explained before, the output of the pump will be directed through the conduit 31 to the cylinder 14 to raise the lift rod 13 and frame 6. When the frame 6 has reached the top limit of its travel as determined by the position of the stop 42, the rod 41 will lift the control rod 40 to open the toggle switch 39 and stop the pump motor. The oil in the cylinder having no open escape passage, the saw will remain in its raised position until released by the operator.

At this time the stock to be sawed may be positioned in the vise 3 and the saw motor 19 started by pressing the switch 44. Operation of the motor 19 will rotate the saw through the guide rolls 18 and will also rotate the lift rod 13 and piston 15 in the cylinder 14. During this adjustment of the stock the saw has been held raised by the action of the solenoid 34 which is energized through the toggle switch 45. The operator may now set the pressure regulating valve 37 to an opening corresponding to the desired rate of descent of the saw as determined by the hardness and size of the stock, and by pushing in on the control button 47 will de-energize the solenoid 34 permitting the valve 33 to open. This creates an open passage from the cylinder 14 through the conduits 31, 32 and valve 33, conduit 36, pressure regulating valve 37 and conduit 38, back to the reservoir 26. The rate at which the oil will pass from the cylinder to the reservoir and therefore the rate of descent of the frame and saw, is determined by the size of the opening in the regulating valve 37.

As the frame 6 and saw 7 descend by force of gravity against the stock 4, the stock is cut away by the saw and if the regulating valve setting is correct and the stock is uniform in size and hardness, the saw will descend through the stock at a uniform rate. However, should the saw strike a hardened portion in the stock or the size of the stock change in cross-section, a greater load will be thrown on the saw and the saw will deflect upwardly due to its inability to cut away the stock as fast as the frame descends. This upward deflection of the saw in the saw guides 17 will lift up on the roller 53 and plunger 52 to close the microswitch 51. Closing the microswitch energizes the solenoid as was explained before and operates to close the valve 33 so that no more oil may escape from the cylinder 14 and the descent of the frame is stopped, permitting the cutting action of the saw to catch up with the frame, at which time the saw will reassume its alignment between the guide rolls 18 and release the roller 53 and plunger 52 to open the microswitch. The saw will then continue to operate in the normal manner until another obstruction is encountered in the stock.

When the saw has finished its cut through the stock and reached the bottom of its travel the guard 9 will engage the trip lever 48 to close the toggle switch 45 as was explained previously, and energize the solenoid to close the valve 33. At the same time the control rods 40 and 41 operate to close the toggle switch 39 to start the pump motor and the frame 6 and saw will be raised to their upper starting positions to commence another cycle.

From the above description it should be apparent that my saw may be adjusted by means of the pressure regulating valve 37 and the spring-pressed push rod 52 so that a substantially uniform saw pressure may be maintained completely through a cut in the metal stock without supervision of the machine. Depending upon the size and hardness of the stock to be cut, the saw may be adjusted for maximum rate of descent consistent with the strength and sharpness of the saw, and all that an operator needs to do is to adjust the stock after each cut and restart the machine by pushing in the control button 47 to open the toggle switch 45. Thus, one man may supervise several machines.

The rotation of the lift rod and piston in the hydraulic cylinder makes the saw and frame very sensitive to changes in pressure in the cylinder so that vertical movement of the saw will rapidly react to changes in load on the saw as reflected by the microswitch and the valve 33 controlled by it.

Preferably, the pressure regulating valve and the microswitch are adjusted so that the microswitch operates several times a minute but not oftener. Too frequent operation of the microswitch indicates that the saw is being overloaded or that the composition of the stock is very irregular. If the microswitch does not operate at all, the frame and saw are descending too slowly and full advantage is not being taken of the power of the saw.

I have described my invention in a highly practical commercial form. No attempt has been made to describe other forms or adaptations as it is believed that this disclosure will permit persons skilled in the art to make such changes as are desired.

Having thus described my invention, what I claim as new and desire to secure by Letters Patent, is:

1. In combination with a machine for cutting metal stock and having a base member having a bed plate adapted to hold the stock, vertical slides mounted on said base, a frame slidable on said slides, a band saw rotatably supported on said frame, a motor carried by said frame and arranged to drive said band saw, a hydraulic cylinder mounted on said base and having a piston arranged to raise and lower said frame on said slides, means connected between said motor and said piston for rotating said piston, a hydraulic pump mounted in said base, motor means for driving said pump, a conduit connecting said pump with said cylinder for supplying fluid under pressure to raise said piston and frame, an exhaust conduit from said cylinder, a manually controllable variable opening valve positioned in said exhaust conduit, means for controlling vertical movement of said saw comprising, an electrically operable valve positioned in said exhaust conduit and operative when energized to close said conduit, a switch mounted on said frame and responsive to deflection of said saw for energizing said electrically operable valve, second switch means operable by movement of said frame to its lower and upper limits for respectively starting and stopping said motor means for driving said pump, and a manually operable switch connected to said valve and in parallel with said first switch for energizing said valve independently of said first switch, said manual switch being arranged to be closed automatically by movement of said frame to the bottom of its travel.

2. In combination with a machine for cutting metal stock and having a base member having a bed plate adapted to hold the stock, vertical slides mounted on said base, a frame slidable on said slides, a band saw rotatably supported on said frame, a motor carried by said frame and arranged to drive said band saw, a hydraulic cylinder mounted on said base and having a piston arranged to raise and lower said frame on said slides, a hydraulic pump mounted in said base, motor means for driving said pump, a conduit connecting said pump with said cylinder for supplying fluid under pressure to raise said piston and frame, an exhaust conduit from said cylinder, a manually controllable variable opening valve positioned in said exhaust conduit, means for controlling vertical movement of said saw comprising, an electrically operable valve positioned in said exhaust conduit and operative when energized to close said conduit, a switch mounted on said frame and responsive to deflection of said saw for operating said electrically controlled valve, a second switch arranged to start said motor means for driving said pump when said frame reaches the bottom of its travel and stop said motor means when said frame reaches the top of its travel, a third switch connected in parallel with said first switch for operating said valve, said third switch being manually operable, and means engageable between said frame at its lower limit of travel and said third switch for actuating said third switch.

3. In combination with a machine for cutting metal stock and having a base member having a bed plate adapted to hold the stock, vertical slides mounted on said base, a frame slidable on said slides, a band saw rotatably supported on said frame, a motor carried by said frame and arranged to drive said band saw, and a hydraulic cylinder mounted on said base and having a piston arranged to raise and lower said frame on said slides, means for facilitating movement of said frame comprising, means connected between said motor and said piston for rotating said piston, a hydraulic pump mounted in said base, motor means for driving said pump, a conduit connecting said pump with said cylinder for supplying fluid under pressure to raise said piston and frame, an exhaust conduit from said cylinder, a variable opening valve positioned in said exhaust conduit, an electrically operable valve positioned in said exhaust conduit, and a switch mounted on said frame and responsive to deflection of said saw to close said electrically controlled valve.

4. In combination with a machine for cutting metal and having a frame, a band saw rotatable around said frame, a guide arm secured to said frame and arranged to guide said saw adjacent to the working portion thereof, an electrical switch mounted on said arm and adapted to be opened and closed by relatively short movement of its mechanism, a follower pivotally mounted on said arm and arranged to ride upon said saw, an actuating member extending between said follower and the mechanism of said switch, and hydraulic means arranged to slidably support said frame on said machine, means for controlling said hydraulic means comprising, electrically controlled valve means connected in said hydraulic means for permitting said hydraulic means to lower said frame, said switch being electrically connected with said valve means to stop the descent of said frame upon deflection of said saw relative to said arm.

5. In combination with a machine for cutting metal and having a frame, a band saw rotatable around said frame, a guide arm secured to said frame and arranged to guide said saw adjacent to the working portion thereof, an electrical switch mounted on said arm and adapted to be opened and closed by relatively short movement of its mechanism, a follower member pivotally mounted on said arm and arranged to ride upon said saw, an adjustable actuating bar extending between said follower member and the mechanism of said switch, and hydraulic means arranged to slidably support said frame on said machine, means for controlling said hydraulic means comprising electrically controlled valve means connected in said hydraulic means for permitting said hydraulic means to lower said frame, said switch being electrically connected with said valve means to stop the descent of said frame upon deflection of said saw relative to said arm.

6. In combination with a machine for cutting metal and having a base, a frame movable on said base, a band saw mounted on said frame, and a hydraulic cylinder and piston connected between said base and said frame for controlling the descent of said frame relative to said base, means for facilitating and controlling the operation of said hydraulic means comprising, means driven with said saw for rotating said piston in said cylinder, an electrically controlled valve connected to the outlet of said hydraulic means, switch means carried on said frame and operable upon deflection of said saw to actuate said valve means to stop the descent of said frame, and other switch means connected in parallel with said automatic switch for actuating said valve, said other switch means being manually operable and mechanically operable by engagement between said frame on said base when said frame reaches its lower limit of travel.

7. In a sawing machine the combination of work supporting means, a saw unit mounted for vertical reciprocating movement relative to said work supporting means, and means connected between said support means and saw unit for controlling the gravity feed of said saw unit including a hydraulic cylinder, a piston coacting therewith and provided with a rotatable piston rod supportingly engaging said saw unit, said saw unit including saw driving means, and driving connections from said saw driving means to said piston rod, whereby the piston rod is rotated to minimize static engagement thereof with said cylinder.

WILLIAM F. WELLS.

REFERENCES CITED

The following references are of record in the file of this patent:

UNITED STATES PATENTS

| Number | Name | Date |
|---|---|---|
| 1,372,903 | Perkins et al. | Mar. 29, 1921 |
| 1,421,107 | Stowell | June 27, 1922 |

FOREIGN PATENTS

| Number | Country | Date |
|---|---|---|
| 800,123 | France | Apr. 20, 1936 |